United States Patent [19]

Caudrelier

[11] Patent Number: 5,657,412
[45] Date of Patent: Aug. 12, 1997

[54] SPLICE CASE FOR FIBRE OPTIC CABLES

[75] Inventor: Jacques Caudrelier, Villorceau, France

[73] Assignee: France Telecom, Establissement autonome de droit public, Paris, France

[21] Appl. No.: 595,265

[22] Filed: Feb. 1, 1996

[30] Foreign Application Priority Data

Feb. 2, 1995 [FR] France ................... 95 01229

[51] Int. Cl.$^6$ .............................................. G02B 6/00
[52] U.S. Cl. .................... 385/135; 385/137; 385/134
[58] Field of Search ............................ 385/135–139, 385/147, 134

[56] References Cited

U.S. PATENT DOCUMENTS 4,709,980 12/1987 Coll et al. ........................... 350/134
4,722,585 2/1988 Boyer ................................. 350/96.2

FOREIGN PATENT DOCUMENTS 4140701 12/1991 Germany.
2260452 10/1992 United Kingdom.
2277812 11/1994 United Kingdom.

Primary Examiner—Phan T. H. Palmer
Attorney, Agent, or Firm—Roland Plottel

[57] ABSTRACT

A fibre-optic splice case has a support for a sealed box which contains a splice connection strip that connects together the ends of two optical fibres from two separate cables. The box is a sealed assembly having a centre of symmetry. The two cables are connectable to the box. The box has a cylindrical support with a central drum and a coaxial outer wall defines therebetween a housing in which the two cables are unreeled or reeled-up in order to deliver or take up a length of cable sufficient to allow the splice to be made. The box also has two separate straight sides each lying substantially in an extension of the other. The straight sides tubular passages are provided for fixing the ends of the two cables. The ends of these straight sides are joined with bottoms of circular overall shape, giving the box a cross-section in the form of a snail-shell.

9 Claims, 4 Drawing Sheets

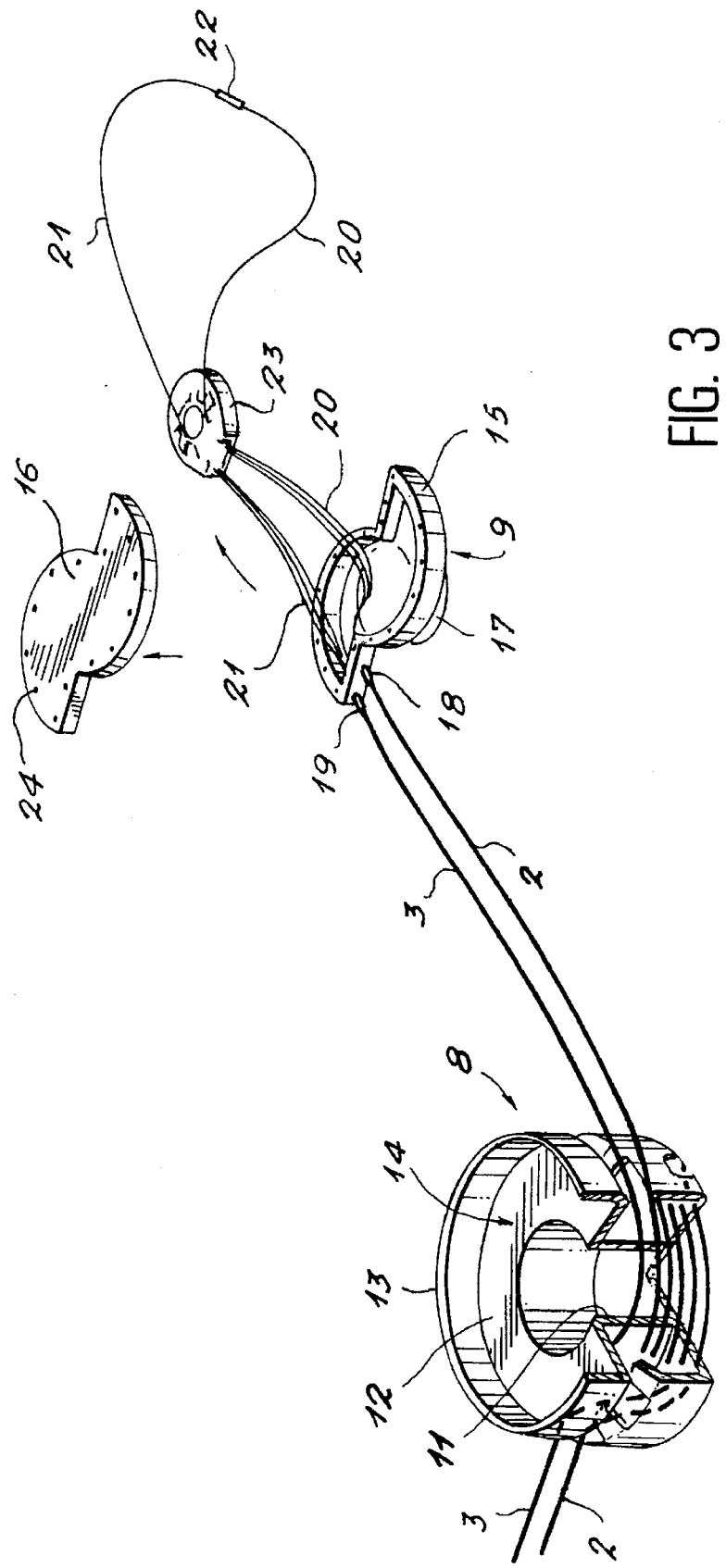

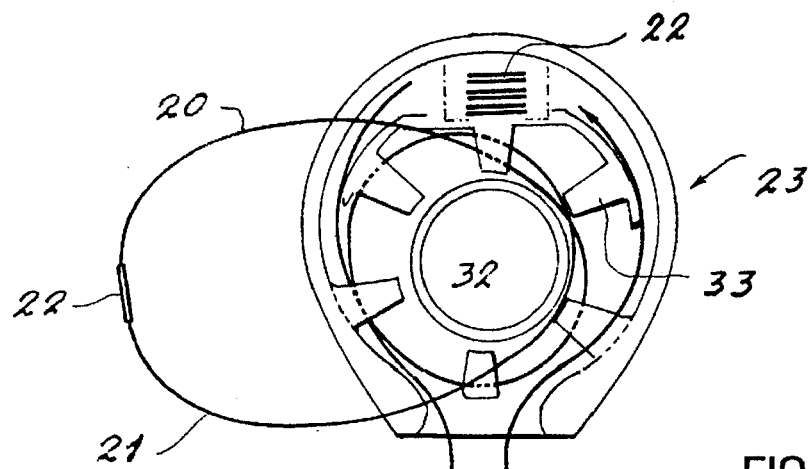
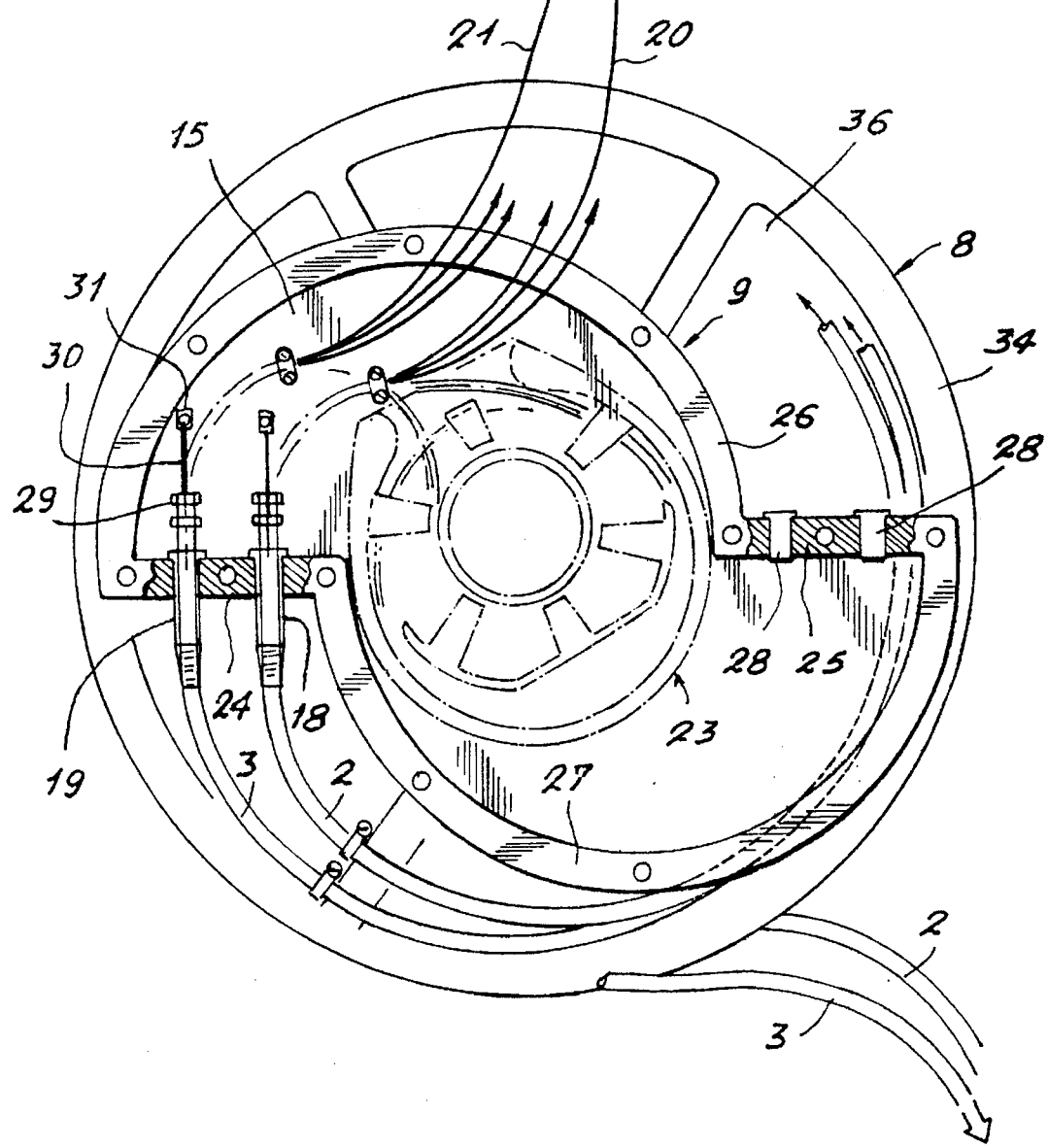
FIG. 4

SPLICE CASE FOR FIBRE OPTIC CABLES

BACKGROUND OF THE INVENTION

1. Field of the Invention

The present invention relates to a splice case for connecting optical fibres placed end to end or as a lateral cap from one of the fibres to the other. This case, which can be buried, including means which make available, as required, the overlength of fibre necessary for the splice to be made satisfactorily and which then, once the splice has been completed, allow this overlength to be taken up again, with the fibre then being coiled up in the case without any detrimental torsional or flexural stress.

2. Description of the Prior Art

It is known that when making a splice at the end or along the free length of an optical fibre belonging to a cable containing, inside an outer protective jacket, a plurality of such fibres, these being parallel or stranded together, requires, for various reasons, that a sufficient length of the chosen fibre be extracted from the protective jacket.

In the first instance, since the optical fibre in question is by nature fragile, it is always possible, when making the splice for connection to another fibre, that one or other of these fibres might break, requiring there still be available a long enough length to start the operation again.

Moreover, the essential steps for ensuring this fibre connection require that the lengths of fibres used are sufficient, in particular for them to be taken to a suitably equipped vehicle, situated near the place where the connection has to be made, in a chamber which is generally buried but which is situated most often at some distance from that place. By way of example, it is common practice to keep some ten meters of free fibre, or overlength, in reserve at each end of the cable.

Once the splice has been completed, the problem then arises of how to keep this overlength in reserve, making uniform turns of fibre, as a figure-of-eight or in round form, with a diameter of curvature large enough to prevent any break or cracking when bending the fibre. This operation is all the more tricky to perform the greater the relative rigidity of the cable, especially when it has to be buried.

The turns or rings of fibre thus obtained, in round form or as a figure eight, are next fixed to the wall of an inner chamber, provided beneath a case where the splice proper is made, the portions of the fibres thus housed are not, however, being protected from shocks or bending which may occur.

SUMMARY OF THE INVENTION

The present invention relates to a fibre-optic splice case which provides a simple and effective solution to these problems, making readily available an appreciable overlength of fibre for making this connection splice and then allowing this unused overlength to be reabsorbed, while ensuring effective protection of the fibre and of the cable from which it came.

For this purpose, the case in question, has a support for a sealed box suitable for containing a splice connection strip connecting together the ends of two optical fibres from two separate cables. The box has a sealed assembly having a centre of symmetry, the two cables being connected up to this box, the cylindrical support comprising a central drum and a coaxial peripheral wall delimiting between them a housing in which the two cables are unreeled or reeled up in order to deliver or reabsorb a length sufficient to allow the splice to be made. The box has two separate straight side portions each lying substantially in the extension of the other, and in which straight side portions tubular passages are provided for fixing the ends of the two cables respectively. The ends of these straight side portions are joined by bottoms of circular overall shape, giving the box a cross-section in the form of a snail-shell.

Advantageously, the central drum of the support includes at its upper end a circular collar arranged to receive the sealed box.

Moreover, and according to another characteristic of the invention, the housing of the support receiving the cables includes clips for locking each cable in place, before they penetrate the sealed box through the tubular passages, imparting these cables with an appropriate curvature.

According to another characteristic, the sealed box is made in two parts which are mutually affixed in a common mid-plane, in the manner of a bottom and a lid, and the tubular passages for the cables are substantially arranged in line with this mid-plane.

According to yet another characteristic, each tubular passage advantageously includes heat-shrinkable sealing sleeves. The box is provided with means for fastening the components of the cable in the extension of these tubular passages.

In accordance with another characteristic of the invention, the support includes an external protective cover, made of plastic or metal, having at least two lateral openings, preferably opposite each other, for the passage of the cables inserted into the housing.

Also according to another characteristic, the peripheral wall of the housing includes an end edge which is inclined inwards so as to make it easier for the cables to be inserted into it.

Yet other characteristics of a fibre-optic splice case, constructed in accordance with the invention, will appear in the following description of one embodiment, given by way of indication and implying no limitation, with reference to the appended drawings, in which:

BRIEF DESCRIPTION OF THE DRAWINGS

FIG. 3 is a perspective view, on a larger scale, of the splice case and of the box which is to be housed therein, as shown diagrammatically in FIG. 2b;

FIG. 4 is a sectional view from above, on an even larger scale, of the case and the box, the latter being shown extracted from the case;

DESCRIPTION OF THE PREFERRED EMBODIMENTS

Figure 1A:
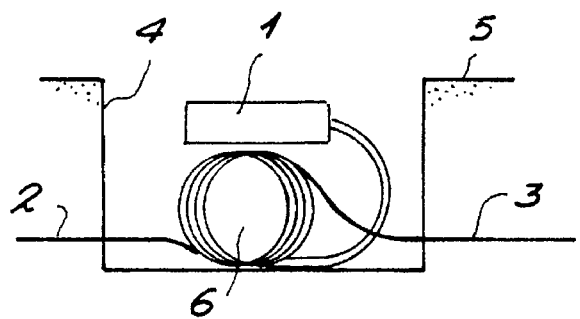
FIGS. 1a and 1b illustrate means for making a splice according to the prior art, showing the difficulty encountered in making available the overlength of cable and consequently of fibre necessary for making such a splice.
Figure 1B:
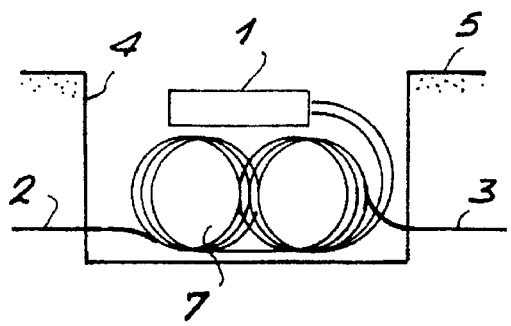

Shown highly diagrammatically in FIG. 1a is a conventional splice case 1, between two fibres coming from two cables, respectively 2 and 3. This case is placed in an open chamber 4, arranged in the ground 5 in which the cables 2 and 3 are buried. The necessary connections to be made at the ends of the fibres to be connected by the case I require both cables to have an appreciable overlength of fibre, which overlength, once the splice has been made, must be put into the chamber 4 by being coiled up on itself in order to form circular turns 6, or else having a configuration 7 in the form of a figure-of-eight, as illustrated in FIG. 1b which adopts the same arrangement as in FIG. 1a.

In both cases, this manner of coiling up the overlength of optical fibre necessary for satisfactorily making the splice, to be placed in the case 1, takes up an appreciable space and, above all, requires the circular a figure-of-eight turns to be fixed or hung against the walls of the chamber 4, beneath the case 1, which does not protect them from possible shocks or bending which could have particularly detrimental consequences.

Figure 2A:
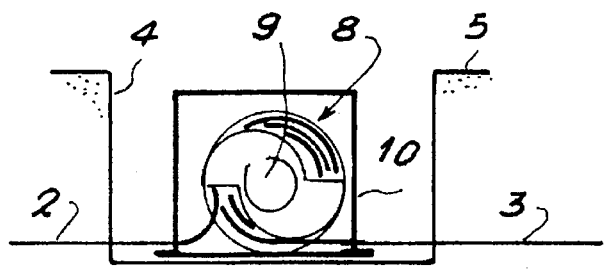
FIGS. 2a and 2b diagrammatically represent a splice case in accordance with the invention, respectively in the position in which the fibre is coiled up in this case and in the position in which it has been extracted therefrom in order to allow the connection of the ends of the fibres to be connected before they are housed in a connection box, the latter being able to be mounted inside the case before this allows the essential overlength to be reabsorbed.

FIG. 2a illustrates a splice case in accordance with the invention, designated in its entirety by the reference 8, this making it possible to group together into a single unit the zone where the ends of the fibres are connected to each other inside a connection box 9 carried by this case and also the zone where the overlengths of the cables 2 and 3, from which the fibres thus connected come, may be easily coiled up, allowing an appropriate length of these cables to be supplied for making this splice, as well as for these overlengths being put back into the case once this splice has been made, then ensuring that the cables are effectively protected. In the chamber 4, the case 8 may advantageously be covered by a protective cover 10, the details of which will be explained later.

Figure 2B:
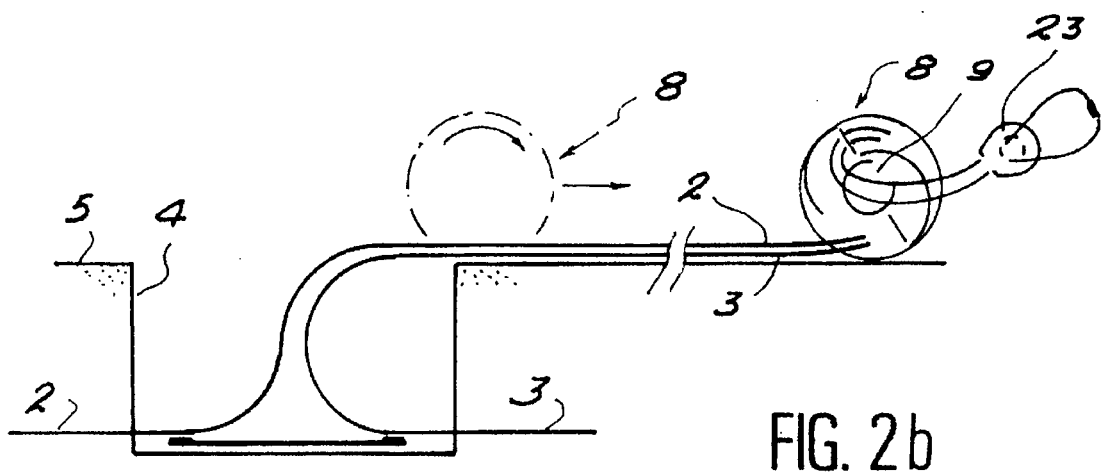

FIG. 2b diagrammatically illustrates the manner in which the case 8 makes it possible, simply by unreeling the cables outside the chamber 4, to provide the overlengths necessary for making the splice proper, which splice, once it has been placed in the connection box 9 and the latter fitted into the case 8, is completely protected, reeling the case in the opposite direction, in order to bring it back to the chamber 4, allowing the previously supplied overlengths to be taken up again, and placing the corresponding turns inside the housing in the case.

FIG. 3 illustrates, on a larger scale, the structure of the case 8 and of the connection box 9 for the cables 2 and 3 from which the splice to be fitted into this box is made.

As may be seen in these figures, the case 8, having the overall shape of a cylindrical support, consists especially of a central drum 11, extended at its upper end by a support plate 12 which itself terminates on its external periphery in a rim 13, perpendicular to the plane of the support plate.

The support plate 12 and the rim 13 thus form an open cavity 14 in which the box 9 may be housed, which box is essentially formed by a hollow bottom 15 and an upper lid 16, which join together in a sealed manner in a mid-plane of the box. A circular boss 17, the external diameter of which corresponds substantially to the internal diameter of the drum 11, is provided beneath the bottom 15, in its central part, in such a way that the box can be suitably held in place in the cavity without preventing it from possible movement with respect to the axis of the drum.

Figure 6:
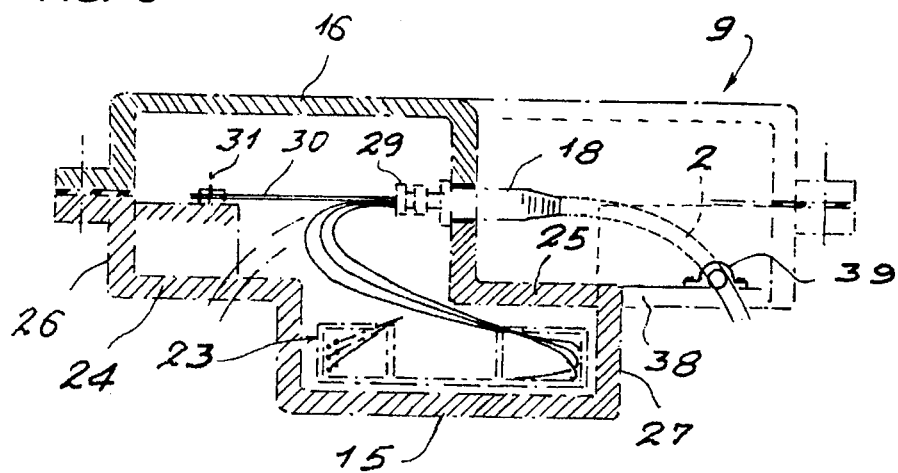
FIG. 6 is a sectional view of the connection box, shown separate from the case.

The cables 2 and 3 are connected up to the box 9, substantially in its mid-plane, by tubular passages such as 18 and 19, the constructional details of which will appear more clearly in FIGS. 4 and 6, these passages being arranged so as to immobilize the ends of the cables with respect to the box 9 and to seal the zone where they penetrate this box, especially by means of heat-shrinkable sleeves (not shown), while at the same time allowing, beyond these passages inside the box, break-out of the various optical fibres, such as 20 and 21, coming from the two cables respectively.

All these fibres 20 and 21 belonging to one or other of the cables 2 and 3, or else only some of these fibres, are provided for being connected together in pairs, each time using an appropriate connection strip 22, the details of which are of little import to the invention and are therefore not described here.

Advantageously, the fibres 20 and 21 and their connection strips 22 are themselves housed in a holder 23, suitable for being fitted and locked in place inside the sealed box 9, between its bottom 15 and its lid 16, these being joined together around their respective peripheries by connection screws 24.

In accordance with the invention and as shown in more detail in FIG. 4, the box 9 is formed so as to give it the shape of a snail-shell, having a centre of symmetry and including for this purpose two straight side portions 24 and 25, each lying substantially in the extension of the other, these straight portions being joined together by two bottoms of circular overall shape 26 and 27, these being symmetrical and opposite each other, the bottom 26 being connected to those ends of the straight portions 24 and 25 which are located on the left-hand side in the drawing, while the bottom 27 is joined to those ends of these same portions which are located on the right-hand side.

The sealed passages 18 and 19, where the cables 2 and 3 end, are provided, in the example in question, in the straight portion 24, the equivalent passages of portion 25 being in this case blocked off by plugs 28. A symmetrical arrangement could, of course, be envisaged with the passages 18 and 19 in the portion 25 and the plugs 28 in the portion 24.

Beyond these passages, the cable jackets are cut so as to allow the break-out of the fibres 20 and 21 contained in these cables, these jackets being immobilized by locking clips 29. Also shown diagrammatically in FIG. 4, on the output side of the cables 2 and 3, are axial reinforcements 30, generally made of metal, equipping these cables, these reinforcements being locked in place against the bottom 15 of the box 9 by fastening means such as 31 (see also FIG. 6).

Still in FIG. 4, it may be seen in more detail how the holder 23 may be formed, in which the connection strips 22 joining together the ends of the fibres 20 and 21 respectively are immobilized, these fibres being wound around a central core 32 provided in this holder and advantageously being housed beneath peripheral retaining tabs 33.

The holder 23, once it has been housed inside the sealed box 9, is held in place against or beneath the edges of the straight portions 24 and 25 (see FIG. 6 again) facing the bottoms 26 and 27 and leaving free with respect to the latter a space sufficient for the swelling of the fibres between the passages 18 and 19 and the holder.

Figure 5:
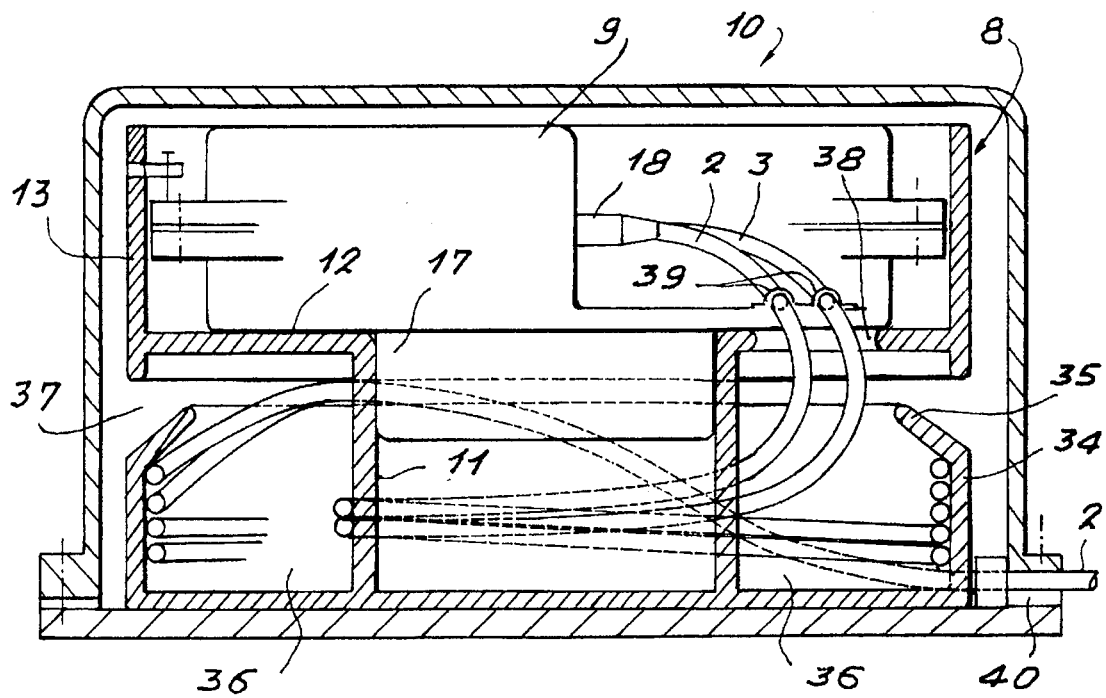
FIG. 5 is a cross-sectional view of the case illustrated in FIG. 4, with the box mounted therein.

FIG. 5 illustrates, seen in partial cross-section, the case 8 into which the sealed box 9 is fitted by its boss 17, this box itself containing the holder 23 (not shown in this figure).

The corresponding sectional view makes it possible to see more clearly the structure of the case 8 which includes, around the central drum 11, a coaxial peripheral wall 34 having, at its upper end, an edge 35 which is inclined towards the inside of the housing 36 delimited between the drum and the wall and leaving, beneath the support plate 12, a circular opening 37 for inserting or extracting the cables 2 and 3 depending on whether the case is reeled up or unreeled along the ground, as illustrated in FIG. 2b seen above.

The support plate 12 moreover includes an opening 38 for the passage of the ends of the cables, these cables being held in place with respect to the box 9 by locking and guiding clips 39.

Next, the whole assembly is covered with the protective cover 10, this being, of course, removable in order to allow access to the box 9 and, after opening the latter, to the holder 23, this protective cover being made of an appropriate plastic or metallic material. Near its lower end, the cover includes at least two through-openings 40 for the cables 2 and 3, only one of these openings appearing in the drawing.

A fibre-optic splice case of simple design is thus produced, which allows both the splice proper to be made between the fibres to be joined, before their connections are fixed to a holder which is itself housed and immobilized in a sealed box, and also allows there to be available, as required, any overlength of cable possibly necessary for modifying or redoing any of the splices thus made. The structure of the case then allows this overlength to be reliably and easily taken up again, without imposing any stress on the fibres themselves, as on the cables, which are reeled up naturally, without bending or twisting, into the case in the housing that it has beneath the cavity for receiving the sealed box.

The case has a relatively small overall size and allows the cables to be housed optimally, the protective cover giving effective protection of the case from ground pressures when this case is buried, in respect of ordinary communication cables.

Of course, it goes without saying that the invention is not limited to the embodiment more especially described with reference to the appended drawings; on the contrary it encompasses all variations thereof.

I claim:

1. Fibre-optic splice case comprising a support for a sealed box suitable for containing a splice connection strip for connecting together the ends of two optical fibres from two separate cables, wherein the box comprises a sealed assembly having a centre of symmetry, the two cables being connected up to this box, the cylindrical support comprising a central drum and a coaxial peripheral wall delimiting therebetween a housing in which the two cables are unreeled and reeled-up in order to deliver and reabsorb a length sufficient to allow the splice to be made, to be mounted inside the box which has two separate straight side portions each lying substantially in the extension of the other, in which straight side portions tubular passages are provided for fixing the ends of the two cables respectively, the ends of these straight side portions being joined by bottoms of circular overall shape, giving the box a cross-section in the form of a snail-shell.

2. Splice case according to claim 1, wherein in the central drum of the support includes at its upper end a circular collar arranged to receive the sealed box.

3. Splice according to claim 2, wherein the housing of the support receiving the cables includes clips for locking each of said cables in place, before said cables penetrate the sealed box through the tubular passages, imparting these cables with an appropriate curvature.

4. Splice according to claim 1, wherein the housing of the support receiving the cables includes clips for locking each of said cables in place, before said cables penetrate the sealed box through the tubular passages, imparting these cables with an appropriate curvature.

5. Splice case according to claim 1, wherein the sealed box is made in two parts which are mutually affixed in a common mid-plane, in the manner of a bottom and a lid, the tubular passages for the cables being substantially arranged in line with this mid-plane.

6. Splice case according to claim 1, wherein each tubular passage includes heat-shrinkable sealing sleeves, the box being provided with means for fastening the components of the cable in the extension of these tubular passages.

7. Splice case according to claim 1, wherein the support includes an external protective cover, made of plastic, having at least two lateral openings, preferably opposite each other, for the passage of the cables inserted into the housing.

8. Splice case according to claim 1, wherein the support includes an external protective cover, made of metal, having at least two lateral openings, preferably opposite each other, for the passage of the cables inserted into the housing.

9. Splice case according to claim 1, wherein the peripheral wall of the housing includes an end edge which is inclined inwards so as to make it easier for the cables to be inserted into it.

* * * * *